United States Patent Office 3,476,609
Patented Nov. 4, 1969

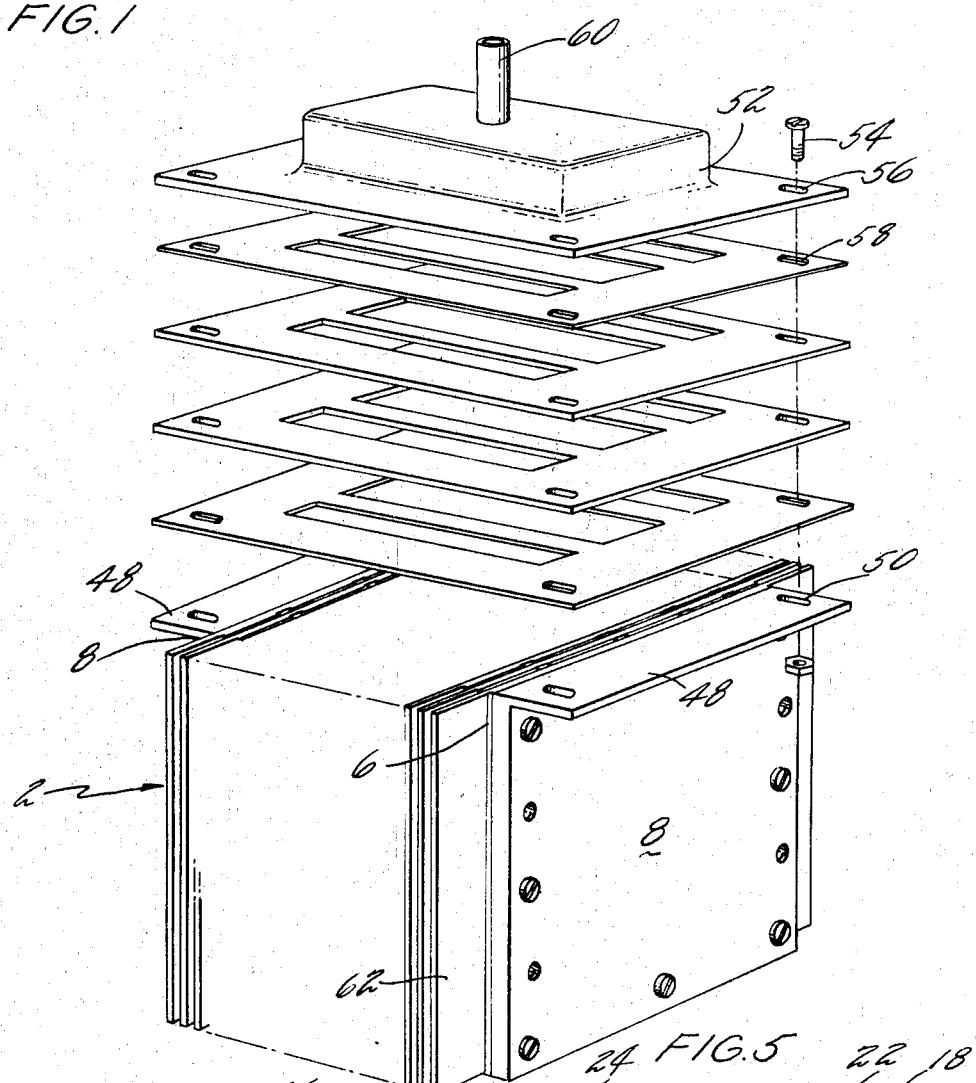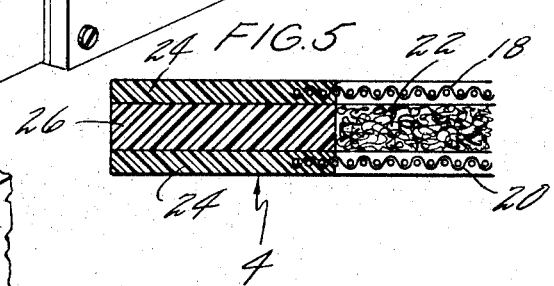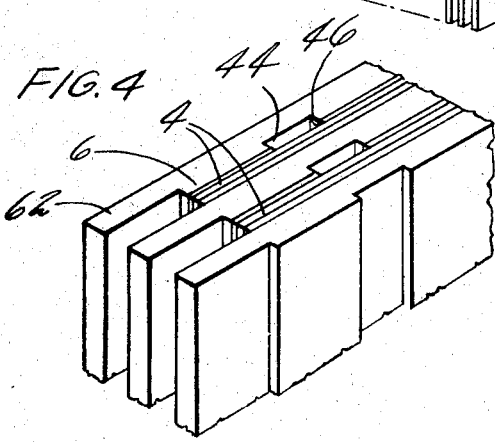

3,476,609
FUEL CELL MODULE

Raymond L. Gelting, Manchester, Anthony J. Fiorentino, East Hartford, and Arthur C. Rogers, Bloomfield, Conn., assignors to United Aircraft Corporation, East Hartford, Conn., a corporation of Delaware
Filed Mar. 30, 1967, Ser. No. 627,128
Int. Cl. H01m 27/02
U.S. Cl. 136—86                                     11 Claims

ABSTRACT OF THE DISCLOSURE

A fuel cell module in which unitary fuel cell assemblies consisting of electrodes on opposite sides of an electrolyte matrix are arranged in a stack with spacer plates therebetween that provide the fuel and oxygen chambers and with connections to external fuel and oxidant supplies.

---

This application is reported as a Subject Invention under Government contract DA-28-043-AMC-00320(E).

BACKGROUND OF THE INVENTION

This invention relates to fuel cell modules and particularly to an arrangement of individual fuel cell assemblies and spacer plates that make up an operative module producing electrical energy to the desired voltage.

In prior devices of this character each electrode is normally made up in the form of a chamber, one wall of which is the porous electrode surface and a pair of these electrodes are positioned on opposite sides of a matrix which is impregnated with an electrolyte in the operation of the fuel cell. Such a configuration makes each individual fuel cell relatively thick and heavy and thereby provides a relatively large fuel cell module when a plurality of cells are stacked together. In many installations particularly where weight and size are critical, it is desirable to reduce the space occupied by each individual fuel cell to a minimum in order to reduce the size of the assembled module to a minimum.

SUMMARY OF INVENTION

One feature of the present invention is a fuel cell module in which unitary fuel cells consisting of a pair of electrodes positioned on opposite sides of a matrix are assembled in stacked relation with spacer plates, the latter being formed on opposite surfaces to provide chambers cooperating with the adjacent fuel cell assemblies for the supply of fuel and oxidant to the electrodes.

Another feature of the invention is an arrangement of the spacer plates so that heat generated within the cell may be more easily removed from the cell. Another feature is the incorporation of suitable passages in the assemblage of the module so that the fuel and oxidant may be delivered effectively to the appropriate chamber within the module.

The present invention provides a compact module capable of producing electrical energy to the desired voltage and which is put in operation with a minimum of connections thereto.

BRIEF DESCRIPTION OF THE DRAWINGS

FIG. 1 is a perspective view of the module showing the cell stack in assembled relation and with the plenum chamber for supplying air to the cell in a position for assembly to the remainder of the module.

FIG. 4 is a sectional view through a unitized fuel cell.

FIG. 5 is a fragmentary enlarged view of a portion of FIG. 1.

DESCRIPTION OF THE PREFERRED EMBODIMENT

Figure 2:
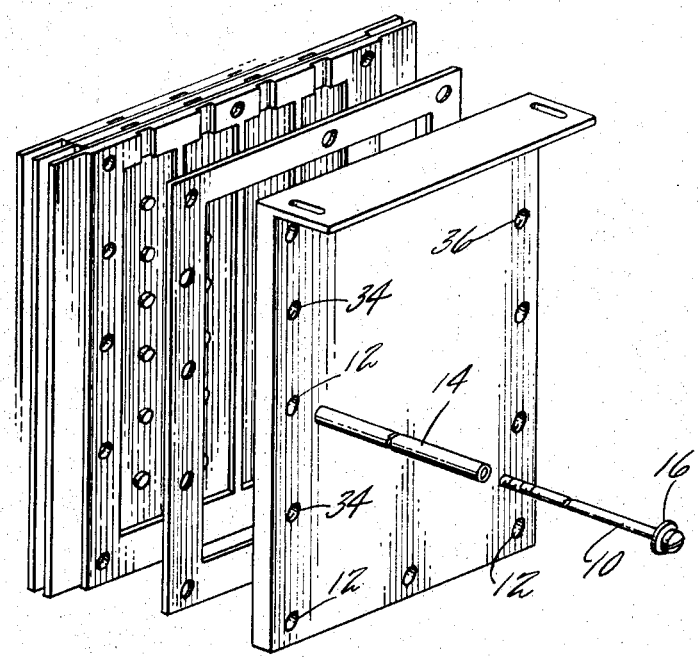
FIG. 2 is a perspective view of the end plate of the stack together with a plurality of cells in spaced relation ready for assembly.

Referring first to FIG. 1 the module consist of a stack 2 of fuel cell assemblies 4 and spacer plates 6 held together by end plates 8. Bolts 10, FIG. 2, extend through the entire stack and seal the end plates together and clamp the elements of the stack in secure relationship, one to another. As shown in FIG. 2 the bolts 10 extend through openings 12 in the end plates and the elements of the stack and are preferably surrounded by suitable insulating tubes 14 preferably of a material such as "Teflon" and suitable insulating washers 16 insulate the head of the bolt from the end plate with which it is in contact. By suitably insulating the bolts any short circuiting of the module through the bolts is prevented.

For the purpose of substantially reducing the size of the module, each fuel cell assembly 4 is a thin unitized fuel cell and consists, as shown in FIG. 5, of electrodes 18 and 20 positioned on opposite sides of a matrix 22 which in the operation of the module is impregnated with an electrolyte. One form of a unitizing fuel cell is described and claimed in the copending application of Maurer, Ser. No. 617,955, filed Feb. 23, 1967 and having the same assignee as the present application. The electrodes 18 and 20 may be, for example, a nickel screen element coated with a suitable catalyst, for example, a mixture of polytetrafluoroethylene and platinum. The matrix 22 may be made of asbestos fibers but particularly of a porous material that is nonreactive with the electrolyte. The electrolyte itself may be an aqueous solution of potassium hydroxide. The peripheries of the electrodes are embedded in a frame 24 of a dielectric material impervious to the electrolyte and these frames are integrally held together by another frame 26 that extends around the matrix. All of the frames may be, for example, an epoxy curable under heat and pressure and firm enough to provide a substantially stable dimensioned periphery for the individual fuel cell assembly.

Figure 3:
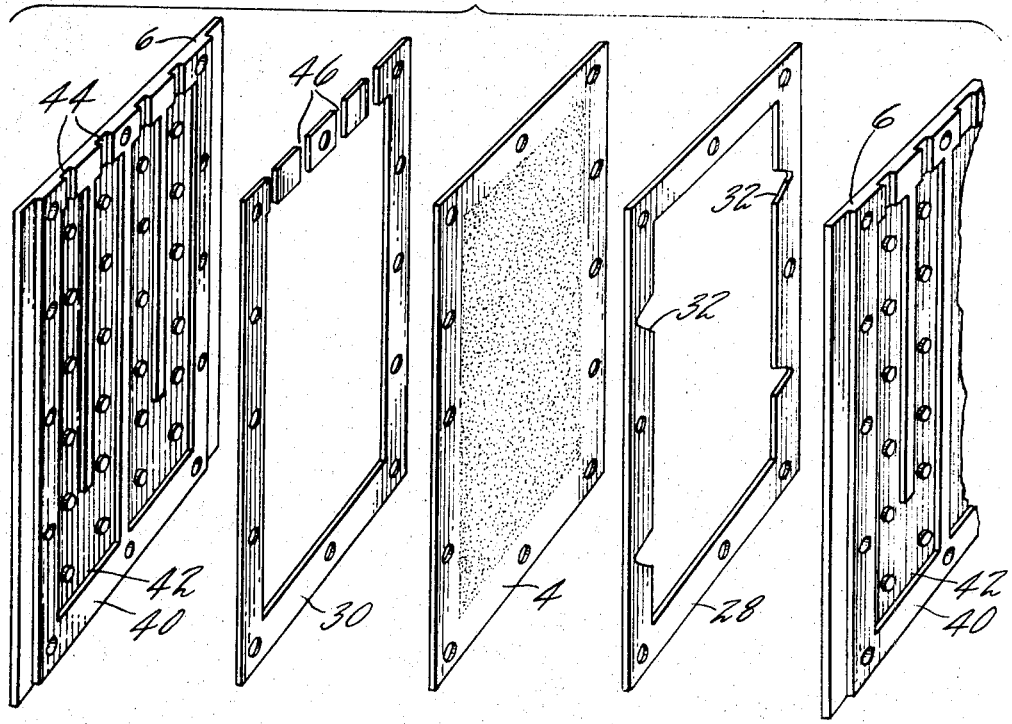
FIG. 3 is a perspective view with the elements spaced apart showing the several elements that go to make up one operative cell of the stack.

Positioned on opposite sides of the unitized fuel cell 4 in making up the stack are sealing gaskets 28 for the hydrogen side of the electrode and sealing gaskets 30 on the air side of the electrode (FIGURE 3). Each of these gaskets is in the form of a frame having the same dimension as the frame for the unitized fuel cell. The gasket on the hydrogen side has notches 32 therein which communicate with hydrogen passages 34 extending through all of the elements of the module and through which hydrogen is supplied to the individual fuel cells. In the particular arrangement shown, the notches 32 on one side of the gasket communicate with hydrogen inlet passages 34 and other passages 36 the notches 32 on the other side communicates with the discharge of excess hydrogen from the stack.

The spacer plates 6 are positioned between adjacent fuel cell assemblies in the stack and these plates have sealing perimeters 40 of the same dimension as the sealing perimeter of the unitized fuel cell. These spacer plates provide for appropriate spacing for adjacent fuel cells and are recessed on opposite sides as shown at 42 to provide when the module is assembled a hydrogen chamber on the hydrogen side of the fuel cell with the notches 32 communicating with the chamber and on the opposite side of each spacer plate an oxygen chamber communicating with the oxygen side of the fuel cell. The arrangement of the recesses on opposite sides of the spacer plates are shown and described in the copending application of Lane et al., Ser. No. 592,420, filed Nov. 7, 1966. It may be noted that, as shown in FIG. 3, the sealing perimeter on the air side of the spacer plate has a plurality of grooves 44 extending across the entire width of the perimeter for the inflow and outflow of oxidant normally in the form of air to the oxidant chamber. It may be desirable to incorporate similar passages 46 in the cooperating sealing gasket 30, FIG. 3. The passages 44 and 46 extend across the sealing perimeter and appear in the surface of the cell stack, as shown in FIG. 1, for the supply of oxidant from a point externally of the stack into the module.

In the assembly of the full module, the appropriate number of fuel cell assemblies is selected to provide the desired voltage in the module and these are arranged in stacked relation following the pattern shown in FIG. 3. That is to say, beginning with the end plate 8 of FIG. 1 a spacer plate 6 is positioned against the end plate preferably with a gasket therebetween, a gasket 30 is placed against the spacer plate, a unitizing fuel cell assembly is then put in place, a hydrogen gasket 28 placed on top, and then another spacer plate 6. Next will obviously be another air gasket 30 and another fuel cell assembly, etc. until the desired assemblage is completed. The last element to be added is a final spacer plate 6 and then the other end plate after which the entire module is bolted together.

As shown in FIG. 1 the end plates 8 have flanges 48 thereon with slots 50 therein and these plates are provided for attachment to the module of a plenum chamber 52. This chamber is fully described in the copending Gelting application, Ser. No. 586,252, filed Oct. 12, 1966 and having the same assignee as this application. For the purpose of this invention, it is sufficient to note that this plenum chamber and the gaskets between it and the flanges 48 are secured in position by a plurality of bolts 54 extending through slots 56 in the plenum chamber and slots 58 in the several gaskets. These slots are provided to accommodate any tolerances built up in the assembly of stacked fuel cells and spacer plates. The slotted arrangement also makes it possible to add an extra fuel cell and spacer plate if it becomes desirable in order to obtain the desired voltage. For the purpose of this application, it is sufficient to note that an air supply from outside the module is admitted to the plneum chamber through an air inlet 60 and thence reaches the oxygen chambers through the grooves 44 and 46.

The spacer plates 6 have projecting flanges 62 on opposite sides thereof and these projecting flanges are preferably thinner than the sealing perimeter of the spacer plates. The thinner flanges reduce the total weight of the module and at the same time improve the flow of cooling air over these flanges when the module is in operation.

With a module of this character the assembled device becomes an operative entity ready for mounting in a fuel cell system. Power output from the stack may be picked up from the end spacer plates, as will be apparent, and the stack may be put in operation by the supply of fuel, such as gaseous hydrogen, to the inlets 34 and an oxidant which may be air to the oxidant inlet 60.

We claim:

1. A fuel cell module, comprising a plurality of electrode assemblies each including a cathode, an anode, a matrix positioned therebetween and a sealing perimeter of a predetermined thickness holding the anode and cathode in assembled relation, said sealing perimeter providing a seal for electrolyte between the electrodes and in the matrix, in combination with oxidant and fuel spacer plates between the electrode assemblies, each spacer plate having a sealing perimeter to engage the sealing perimeters on the electrode assemblies, each spacer plate being recessed on opposite sides to form a chamber between the plate and the associated plate on each side, and grooves across the sealing perimeter on each side of the spacer plate for the supply of oxidant and fuel to the respective chambers, the grooves to the oxidant chamber being at a different location on the perimeter than the grooves to the fuel chamber.

2. A fuel cell module as in claim 1 in which the oxidant grooves extend to the outside of the module, and a plenum chamber mounted on the face of the module supplies air to all the oxidant grooves.

3. A fuel cell module as in claim 1 in which the module is held together by bolts located in the sealing perimeters.

4. A fuel cell module as in claim 1 in which the spacer plates have projecting fins along at least one edge beyond the sealing perimeter for the purpose of cooling the module.

5. A fuel cell module as in claim 1 in which each side of the spacer plates has projections within the recessed area of a height to engage the adjacent electrode when the module is assembled.

6. A fuel cell module as in claim 1 in which a spacer gasket is provided on each side of the spacer plate to engage with the sealing perimeters of the plates and the adjacent electrode assembly.

7. A fuel cell module having a plurality of electrode assemblies in stacked relation, each assembly including spaced electrodes, a matrix therebetween and a sealing perimeter holding the electrodes in position and forming a seal to retain electrolyte between the electrodes, and a spacer plate between adjacent electrode assemblies, each spacer plate having a sealing perimeter corresponding in dimension to the sealing perimeter of the electrode assemblies and each spacer plate being recessed on opposite sides inwardly of the sealing perimeters to define with the adjacent electrode a chamber for oxidant or fuel, and grooves across at least part of the sealing perimeter of the spacer plate to communicate between an external source of fuel or oxidant and the respective chambers.

8. A fuel cell module as in claim 7 in which end plates are provided at each end of the module and bolts extending through the end plates and the entire stack for holding the module in assembled relation.

9. A fuel cell module as in claim 8 in which the bolts are surrounded by insulating tubing to avoid shorting between the end plates.

10. A fuel cell module as in claim 7 in which the grooves formed in the sealing perimeter of the spacer plates for the supply of oxidant pass entirely across the sealing perimeter and a plenum chamber mounted on the face of the module provides communication with the oxidant passages.

11. A fuel cell module as in claim 7 in which a fuel passage is provided through the sealing perimeters of the electrodes and the spacer plates and the sealing perimeter of each spacer plate has grooves therein extending from the fuel passage to the fuel chamber in the plate.

References Cited

UNITED STATES PATENTS

| 3,226,262 | 12/1965 | Rohrback et al. | 136—86 |
| 3,288,644 | 11/1966 | Delfino | 136—86 |
| 3,328,204 | 6/1967 | Grubb | 136—86 |
| 3,331,706 | 7/1967 | Jenkins | 136—86 |

FOREIGN PATENTS 1,379,800  10/1964  France.

ALLEN B. CURTIS, Primary Examiner